United States Patent Office 3,711,452
Patented Jan. 16, 1973

3,711,452
LIQUID ACRYLATE POLYMERS OF
IMPROVED VULCANIZABILITY
Alan A. Csontos, Norton, Ohio, assignor to The B. F.
Goodrich Company, New York, N.Y.
No Drawing. Filed May 12, 1971, Ser. No. 142,807
Int. Cl. C08d 3/02
U.S. Cl. 260—79          5 Claims

ABSTRACT OF THE DISCLOSURE

Liquid mercaptan-terminated acrylate polymers that can be cured to a tack-free surface at application temperatures and have low temperature extensibility are obtained by first preparing an intermediate polymer by polymerizing an alkyl acrylate with a vinylidene

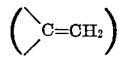

monomer containing an epoxide

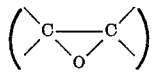

group in the presence of a dixanthogen disulfide, and then pyrolyzing the intermediate polymer at elevated temperatures under vacuum.

BACKGROUND OF THE INVENTION

Acrylate elastomers possess good weatherability and oil resistance. These properties are advantageous in base polymers used in sealants, caulks, and like formulations. However, for ease of application, the sealant or caulk must be pourable at application temperatures, or extrudable as from a tube, or moldable under slight pressure. This can be attained either by dissolving a solid acrylate elastomer in a suitable solvent or by using a low molecular weight (liquid) acrylate polymer that is capable of being cured to a solid elastomer after being applied. Since organic solvents may be hazardous or toxic, a low molecular weight (liquid) acrylate polymer is a more desirable form.

A sealant or a caulk should have elastomeric properties over a wide range of temperatures, especially low temperatures. General Services Administration Specification TT–S–00227E Requirement 3.5.8 Durability requires that a sealant have extensibility at −15° F. (−26° C.). To meet this, alkyl acrylates wherein the alkyl group contains three or more carbon atoms are used to make polymers having a Tg (glass transition temperature) of below −26° C. But when these polymers are vulcanized they are slow to cure and often have a tacky surface.

SUMMARY OF THE INVENTION

This invention provides acrylate polymer compositions, pourable at application temperatures, having a Tg value below −15° F. (−26° C.), having terminal mercaptan groups and pendant epoxide groups, that are readily cured at application temperatures to a substantially tack-free surface.

DETAILED DESCRIPTION

The mercaptan-terminated liquid acrylate polymers are prepared by first preparing an intermediate polymer by polymerizing together alkyl acrylate monomers with a vinylidene (>C=CH$_2$) monomer containing an epoxide

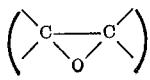

group in the presence of a dixanthogen disulfide, and then hydrolyzing or pyrolyzing the intermediate polymer form the mercaptan groups.

The acrylates used are alkyl acrylates of the gene structure

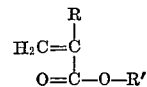

wherein R is —H, —CH$_3$, or —C$_2$H$_5$ and R′ is an alkyl group containing 1 to 18 carbon atoms. The acrylates m be used singly or in combination to obtain polymers h$_{a}$ ing in their cured state a Tg value below −26° C. Ty cal acrylates are ethyl acrylate, n-butyl acrylate, isobu acrylate, n-hexyl acrylate, 2-methylhexyl acrylate, meth methacrylate, n-butyl methacrylate, n-octyl methacryla n-octadecyl methacrylate, ethyl ethacrylate, and the lil Useful compositions include at least 13 parts by wei$_{g}$ of an alkyl acrylate where the R group is —H and t R′ group contains 3 to 8 carbon atoms with ethyl ac$_{1}$ late. A particularly useful composition is about 20 to parts by weight of ethyl acrylate and about 60 to 80 pa by weight of normal butyl acrylate.

In place of part of the alkyl acrylates, small amou$_{1}$ of other vinylidene monomers may be used as long as t polymeric Tg is not higher than −26° C. Typical vin$_{y}$ dene monomers which may be used are up to about parts by weight of acrylonitrile, methacrylonitrile, s$_{1}$ rene, and α-methyl styrene; up to about 20 parts by wei$_{g}$ of vinyl acetate; and about 20 to 30 parts of vinyl ethe such as vinyl methyl ether, vinyl ethyl ether, and vir n-butyl ether, and vinyl ketones, such as vinyl meth ketone, vinyl ethyl ketone, and vinyl isopropenyl keto$_{1}$ and the like.

The epoxide-containing vinylidene monomers are us in the range of about 2 to 20 parts by weight based 100 parts by weight of the total alkyl acrylates to obt$_{a}$ the desired polymers. Typical epoxide-containing viny dene monomers are the vinylidene glycidyl esters such glycidyl acrylate, glycidyl methacrylate, and glycidyl c$_{1}$ tonate, and the like, and vinylidene glycidyl ethers su as allyl glycidyl ether, methallyl glycidyl ether, and i$_{s}$ propenyl glycidyl ether. The preferred epoxide-conta$_{1}$ ing vinylidene monomer is glycidyl acrylate as it co$_{p}$ lymerizes fast and efficiently with the alkyl acrylate mor mers. The preferred range of glycidyl acrylate is about to 10 parts by weight per 100 parts by weight of al$_{k}$ acrylates.

The mercaptan groups are introduced into the polym by the use of dixanthogen disulfides as the initiator an or modifier in the polymerization of the monomers. T$_{1}$ results in terminal xanthate groups which when react in a base catalyzed hydrolysis using an agent such KOH, or under conditions of pyrolysis, form termin mercaptan groups. The dixanthogen disulfides employ correspond to the general formula

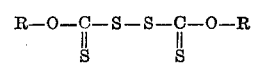

where R may be an alkyl group of 1 to 8 carbon aton an aryl group such as phenyl, an aralkyl group such benzyl, and an alicyclic group such as cyclohexyl. Ty$_{1}$ cal dixanthogen disulfides are diisopropyl xanthogen $_{c}$ sulfide, disecondary butyl xanthogen disulfide, di((β-nap thyl)xanthogen disulfide, and dicyclohexyl xanthogen $_{c}$ sulfide. Preferred dixanthogen disulfides are the alkyl $_{c}$ xanthogen disulfides where the alkyl group contains 3 6 carbon atoms. The dixanthogen disulfides are used range from about 2 parts to 20 parts by weight based 100 parts of the alkyl acrylates. A more preferred  e is from about 4 to 12 parts by weight.
mploying amounts of alkyl acrylate monomer, epoxcontaining vinylidene monomer, and of dixanthogen lfide as stated above, and polymerizing the monomers ther in the presence of a dixanthogen disulfide to  ve 60% conversion of monomers to polymer, and  t reacting the polymer made under conditions of hysis or pyrolysis to form the mercaptan gorups, yields id acrylate polymers containing from about 1% to  ) by weight of epoxide groups and about 0.5% to 8% veight of mercaptan groups based on the total weight he polymer. The preferred range of epoxide content om about 2% to 6% by weight based upon the weight olymer.
he polymers contain about 56% to 96% by weight of lacrylates of the formula

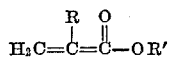

re R is —H, —CH$_3$ or —C$_2$H$_5$ and R' is an alkyl ip containing 1 to 18 carbon atoms, about 3% to 36% veight of a vinylidene monomer containing an epoxide ture, and a mercaptan content of about 0.5% to 8% veight based upon the total weight of the polymer. e preferred is a polymer where the alkylacrylate conis about 1% to 65% by weight ethyl acrylate and it 13% to 92% by weight of an alkylacrylate of the ula

re R is an alkyl group containing 3 to 10 carbon atoms, vinylidene monomer is glycidylacrylate in amounts 1 about 6% to 18% by weight, and the mercaptan conis from about 1% to 4% by weight based upon the l weight of the polymer.
he intermediate xanthate-terminated liquid acrylate mers are readily prepared by free radical polymeriza. Conventional emulsion or suspension polymerizatechniques may be used employing those ingredients polymerization conditions known to the art, or bulk olution polymerization techniques may be used. Either dixanthogen disulfide used alone or used with freeal catalysts initiates polymerization. Typical freeal catalysts that can be used are organic peroxides hydroperoxides, persulfates, azo compounds, and the of redox systems. One preferred method is to use the nthogen disulfide alone without the use of further radical catalysts and to use ultra-violet (UV) light isassociate the dixanthogen disulfide into free-radicals h initiate polymerization. This method is best emed in bulk or solution polymerization.
ie UV polymerization of the xanthate-terminated d acrylate polymer is performed as taught in U.S. aption Ser. No. 757,785, now U.S. Pat. 3,580,830. The l acrylate monomer(s), epoxide-containing vinyl- ǝ monomer, and the dixanthogen disulfide are ged to a reactor vessel along with a solvent if used. No ific order of charging is required, but it is preferable e-dissolve the dixanthogen disulfide in the alkyl acrymonomer(s) or the solvent if used. The reactor ves- s then purged with nitrogen and sealed. Polymerizatemperatures used range from about 20° C. to about
C. A preferred temperature range is from about C. to about 50° C.
ie UV light must be allowed to penetrate to the merization solution. This can be accomplished by ing the UV source within a glass tube in the reactor y having the UV source external to the reactor ves-
sel with the UV light passing through a glass wall or window to the solution. Any lamp generating near UV light, especially in the 3600 A. range may be used. Lamp types and their emission spectra and glass types and their transmission spectra are known to those skilled in the art.
Polymerization is initiated by turning on the UV light source and is stopped by turning off the source. Percent conversion of monomers to polymer is easily followed by taking percent total solids samples. Over 60% conversion of monomers to polymer is desirable.
The xanthate-terminated liquid acrylate polymer is recovered from solution by heating the polymerization solution under vacuum to distill off the remaining monomer(s) and solvent if used. Drying temperatures used range from about 70° C. to 130° C., with 90° C. being a convenient temperature.
The xanthate-terminated liquid acrylate polymers having pendant epoxy groups can be treated to form mercaptan groups by the hydrolysis of the xanthate groups under the action of a base such as KOH or by the pyrolysis of the xanthate groups. The hydrolysis method requires a solvent media for both the polymer and the base. This means more ingredients and another recovery step. The preferred method therefore is the bulk pyrolysis method. In this method, the xanthate-terminated liquid acrylate polymer is charged into a reactor vessel and heated to above 130° C. under vacuum. A useful temperature range is from about 130° C. to 260° C., whereas a temperature range of about 160° C. to 220° C. is more preferred. The pyrolysis may be performed in a batch of a continuous process. The time of pyrolysis varies inversely with temperature, varying from about 10 hours at 150° C. to about 20 seconds at 250° C. A useful batch pyrolysis condition is 20 minutes at 200° C. The breakdown of the xanthate groups is performed under a vacuum to rid the reactor vessel of gaseous carbonyl sulfide and the alkene derivative of the xanthate R group which are given off as by-products.
The mercaptan-terminated liquid acrylate polymers are recovered as bulk products. The mercaptan level on these compositions ranges from about 0.5% by weight to about 8% by weight based on the weight of the polymer. The preferred level is from about 1% to 4% by weight.
The liquid acrylate polymers containing terminal mercaptan and pendant epoxide groups are stable at application temperatures. The polymers may be mixed with compounding ingredients on ink mills, bulk mixing equipment such as Henschel mixers, and the like. Compound ingredients useful in liquid polymers known to those skilled in the art may be used. Typical ingredients are fillers such as clays, TiO$_2$, carbon black, silicas, and the like; lubricants and plasticizers; stabilizers and antioxidants; and pigments.
Cure agents for the mercaptan-terminated liquid polymers are selected from oxidizing agents such as PbO$_2$, PbO$_2$ in the presence of an organic acid such as acetic acid, tertiary butyl perbenzoate, and organic and inorganic peroxides; di- and tri-functional acrylates employing an amine catalyst; diisocyanates such as tolylene diisocyanate, 4,4'-diisocyanato diphenylmethane, and the like; and epoxy resins and epoxy Novalac resins both employing an amine catalyst. Epoxy resins such as diglycidol ethers of Bisphenol A employing an amine catalyst are the preferred curatives. Typical amines are 2,4,6-tri(dimethylaminomethyl)phenol and triethylene tetraamine.
The mercaptan-terminated liquid acrylate polymers containing pendant epoxide groups can be cured to a tackfree surface at application temperatures. This combined with their low Tg value and their good weatherability and oil resistance, make these polymers useful base elastomers for sealant, caulk, and like compounds.
The following examples will further illustrate the invention. In the examples, the amounts of ingredients are expressed in parts by weight unless otherwise stated.

EXAMPLE I

Xanthate-terminated liquid acrylate polymers of ethyl acrylate, normal butyl acrylate, and glycidyl methacrylate were prepared according to the following recipes:

|  | 1 | 2 |
|---|---|---|
| Ethyl acrylate | 70 | 30 |
| Normal butyl acrylate | 30 | 70 |
| Glycidyl methacrylate | 20 | 20 |
| Diisopropyl xanthogen disulfide | 8 | 8 |

The ingredients were charged to a glass reactor vessel equipped for agitation. The vessel was purged with nitrogen and sealed. While being agitated, the solutions were irradiated with ultra-violet (UV) light emitted from an H100 A 4/T mercury lamp positioned about 2" from the vessel. Irradiation time was four and one-half hours. Reaction temperature was about 45° C. Percent conversions of monomers to polymers were 73% for sample 1 and 60% for sample 2. The liquid polymers were recovered by heating the polymer solutions to 90° C. under a vacuum to distill off the unreacted monomers. The epoxide equivalents, as determined by the pyridium chloride method, were 943 for sample 1 and 980 for sample 2. Based on an average molecular weight of the liquid acrylate polymers of about 3000, the prepared polymers each contain about 3 epoxide groups per molecule, or each polymer contains about 4% by weight of epoxide based on the weight of the polymer.

EXAMPLE II

Mercaptan-terminated liquid acrylate polymers were prepared from the polymers of Example I by putting the xanthate-terminated liquid polymers into a reactor vessel and heating them in bulk to 200° C. for 20 minutes. This was done under a vacuum to removed gaseous sulfide and propylene formed from the pyrolysis of the isopropyl xanthate groups to mercaptan groups. The two polymers were then mixed with cure ingredients according to the following recipes:

|  | 1 | 2 |
|---|---|---|
| Mercaptan terminated liquid polymer | 100 | 100 |
| DMP-30 [1] | 1.0 | 1.0 |
| Epon 828 [2] | 15.0 | 15.0 |

[1] 2,4,6-tri(dimethylaminomethyl)phenol.
[2] Diglycidol ether of Bisphenol A.

The two polymers cured to a dry, hard surface in one day at room temperature.

EXAMPLE III

A xanthate-terminated liquid acrylate polymer having no pendant epoxide groups was prepared following the procedure of Example I. The recipe used was 30 parts of ethyl acrylate, 70 parts by normal butyl acrylate, and 6 parts of diisopropyl xanthogen disulfide. 97% conversion was obtained in four hours of irradiation. The bulk polymer had a viscosity of 17,000 cps. at 27° C. as measured by a Brookfield Model LVT viscometer using spindle #7 at 20 r.p.m. The polymer was pyrolyzed following the procedure of Example II. The mercaptan-terminated liquid acrylate had a 23,400 cps. bulk viscosity at 27° C. and a weight percent mercaptan content of 1.52% as measured by iodine oxidation. The polymer was then cured according to the following recipe:

| Mercaptan terminated polymer having no epoxide groups | 1 |
|---|---|
| DMP-30 |   |
| Epon 828 | 1( |

There was no evidence of cure in one day and the polymer had a tacky surface after 7 days at room temperature.

EXAMPLE IV

Xanthate-terminated liquid catalyst polymers were prepared following the procedure of Example I except glycidyl acrylate was used instead of glycidyl methacrylate. The recipes, irradiation times, percent conversion and property data are listed in the following table:

|  | 1 | 2 | 3 | 4 |
|---|---|---|---|---|
| Ethyl acrylate | 30 | 30 | 30 | 30 |
| Normal butyl acrylate | 70 | 70 | 70 | 70 |
| Glycidyl acrylate | 10 | 5 | 3 | 3 |
| Diisopropyl xanthogen disulfide | 8 | 6 | 8 | 6 |
| Irradaition time (hours) | 3.0 | 3.0 | 4.0 | 4.0 |
| Percent conversion | 95 | 94 | 96 | 98 |
| Xanthate-terminated polymer bulk viscosity, cps. at 27° C | 8,800 |  | 7,600 | 23,000 | 1, |
| Epoxy equivalents | 400 |  |  |  |

This demonstrates that the bulk viscosity of the polymers is primarily determined by the level of dixanthogen disulfide used as long as conversions are equivalent. The epoxide contents of the polymers varied with the amount of glycidyl acrylate used. Sample 1 contained about epoxide groups per polymer molecule, or a level of epoxide about 10% by weight based on the weight of the polymer. Sample 5 contained no measurable epoxide content.

EXAMPLE V

The xanthate-terminated polymers of Example IV were pyrolyzed to the mercaptan form following the procedure of Example II, and then cured. Properties of the mercaptan polymers, the cure recipes, and the measured cure properties are listed in the following table. Also included as Sample 6, is a cure of the epoxide-free polymer Example III.

The example demonstrates that the speed and tightness of the cure of the pendant epoxide acrylate polymers is direct result of the amount of glycidyl acrylate used.

These liquid mercaptan-terminated pendant epoxide acrylate polymers have bulk viscosities as measured at 27° C. using a Brookfield model LVT viscometer with spindle #7 at 20 r.p.m. in the range of from about 400 cps. to 2,000,000 cps. A convenient range for many applications from about 5,000 cps. to about 150,000 cps. These polymers formulated with fillers as clays, TiO$_2$, silicas, and carbon black and with plasticizers as Aroclor 606 Cereclor 42, Chlorowax 40, Benzoflex 9-88 and oils Mobilsol 66, are useful caulks for filling cracks and crevices between stone, brick, and re-enforced concrete; sealants for aluminum, steel and concrete to glass junctions potting compounds in which electrical wires or components may be embedded to provide flexible support; and flexible adhesives for wood to wood junctions.

|  | 1 | 2 | 3 | 4 | 5 |  |
|---|---|---|---|---|---|---|
| Weight percent mercaptan | 2.25 | 1.51 | 2.21 | 1.50 | 2.13 | 1. |
| Bulk viscosity, cps. at 27° C |  | 26,000 | 12,000 | 31,000 |  | 23,4 |
| Mercaptan-terminated polymer | 100 | 100 | 100 | 100 | 100 | 1 |
| DMP-30 [2] | 1.5 | 1.0 | 1.5 | 1.0 | 1.5 | 1 |
| Epon 828 [1] | 15.3 | 10.3 | 15.1 | 10.3 | 14.5 | 1( |
| Cure after 7 days at room temperature | Dry | Dry | Dry | Dry | Tacky | Tac |
| Hardness, Durometer A [3] | 55/49 | 40/27 | 49/35 | 38/28 | 10/0 | 1( |
| Percent elongation | 50 | 50 | 100 | 150 | 1,100 | ( |

[1] Used at 1.25 equivalents of Epon 828 to 1 equivalent of mercaptan.
[2] Used at 10% by weight based on the weight of Epon 828.
[3] Instantaneous hardness/hardness after 10 seconds.

claim:

1. A liquid polymer comprising about 3% to about [?]% by weight of a polymerized vinylidene monomer containing an epoxide group selected from the group consisting of glycidyl acrylate, glycidyl methacrylate, glycidyl crotonate, allyl glycidyl ether, methallyl glycidyl ether, and isopropenyl glycidyl ether, about 0.5 to about [?]% by weight of terminal mercaptan groups, and from about 56% to about 96% by weight of a polymerized acrylate of the formula

wherein R is —H, —CH₃ or —C₂H₅ and R' is an alkyl radical containing 1 to 18 carbon atoms, all weight based on the total weight of the polymer.

2. A polymer of claim 1 wherein R is —H and R' is an alkyl radical containing 3 to 10 carbon atoms.

3. A polymer of claim 1 comprising about 6 percent to about 18 percent by weight of glycidyl acrylate, about 1 percent to about 4 percent by weight of terminal mercaptan groups, and about 13 percent to about 92 percent by weight of an acrylate of claim 1 wherein R is —H and R' is an alkyl radical containing 3 to 10 carbon atoms, and from about 1 to 65 percent by weight of ethyl acrylate.

4. A polymer of claim 1 comprising about 6 percent to about 18 percent by weight of glycidyl methacrylate, about 1 percent to about 4 percent by weight of terminal mercaptan groups, and about 13 percent to about 92 percent by weight of an acrylate of claim 1 wherein R is —H and R' is an alkyl radical containing 3 to 10 carbon atoms, and from about 1 to 65 percent by weight of ethyl acrylate.

5. A polymer of claim 1 in a cured state.

References Cited

UNITED STATES PATENTS

| | | | |
|---|---|---|---|
| 3,449,301 | 6/1969 | Noll et al. | 260—79 |
| 3,580,830 | 5/1971 | Siebert | 204—159.24 |

DONALD E. CZAJA, Primary Examiner

M. I. MARQUIS, Assistant Examiner

U.S. Cl. X.R.

117—123 D, 127; 204—159.18, 159.24; 260—28.5 R, 41 A, 41 B, 77.5 CR, 79.5 R, 79.5 C